Dec. 31, 1940.   H. H. MOHL   2,227,398
WRAPPING MATERIAL MEASURING DEVICE
Filed July 14, 1939   3 Sheets-Sheet 1

INVENTOR
Harold H. Mohl
BY Evans & McCoy
ATTORNEYS

Dec. 31, 1940.  H. H. MOHL  2,227,398
WRAPPING MATERIAL MEASURING DEVICE
Filed July 14, 1939   3 Sheets-Sheet 2

INVENTOR
Harold H. Mohl
BY
Evans & McCoy
ATTORNEYS

Dec. 31, 1940.   H. H. MOHL   2,227,398
WRAPPING MATERIAL MEASURING DEVICE
Filed July 14, 1939   3 Sheets-Sheet 3
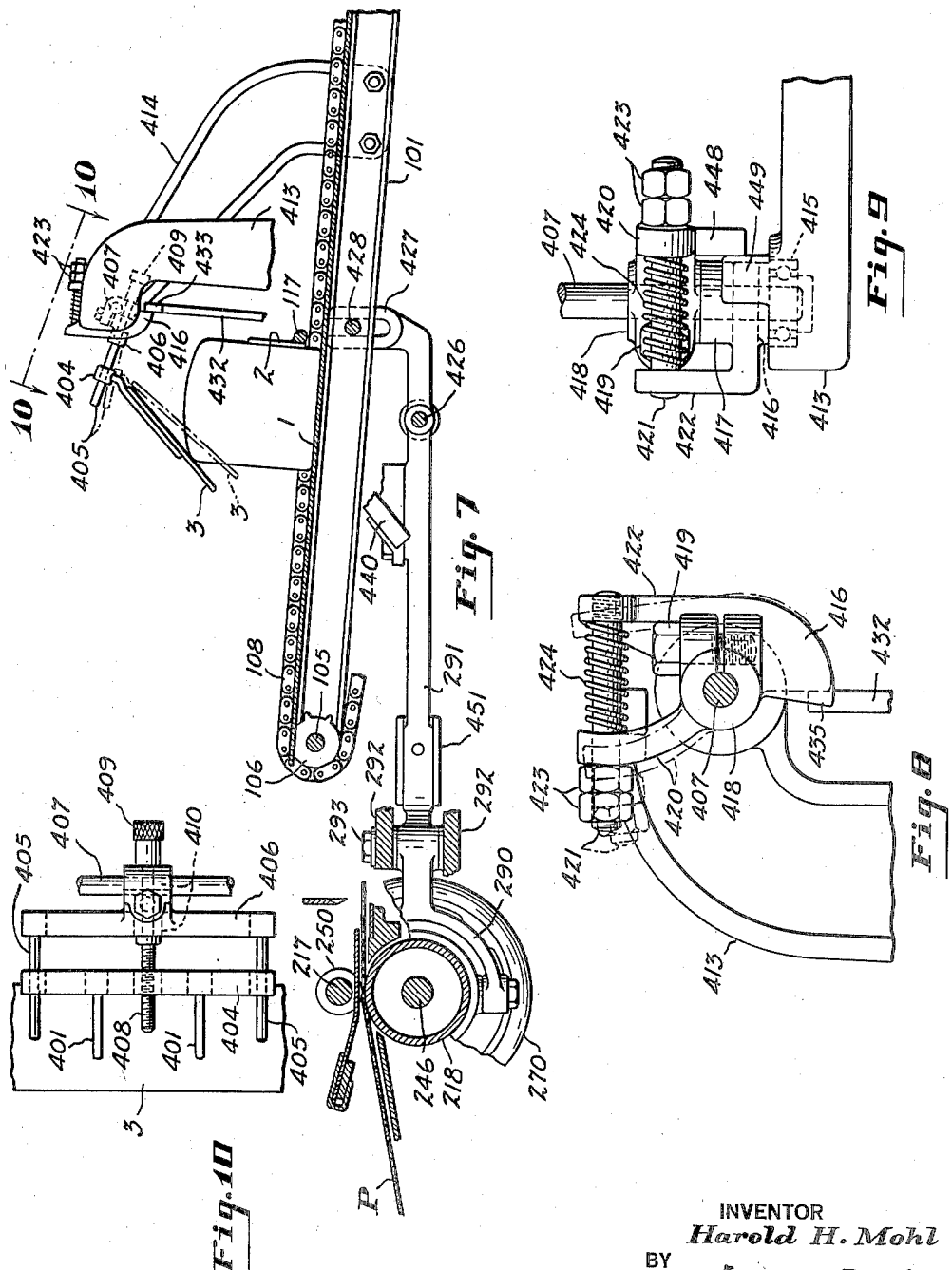
INVENTOR
*Harold H. Mohl*
BY
*Evans & McCoy*
ATTORNEYS Patented Dec. 31, 1940

2,227,398

UNITED STATES PATENT OFFICE 2,227,398

WRAPPING MATERIAL MEASURING DEVICE

Harold H. Mohl, Davenport, Iowa, assignor to Micro-Westco, Inc., Bettendorf, Iowa, a corporation of Delaware Application July 14, 1939, Serial No. 284,519

7 Claims. (Cl. 93—2)

This invention relates to improvements in devices for automatically measuring and feeding a proper amount of wrapping material for wrapping articles which may vary considerably in size and contour.

In the wrapping of articles by machine it is very desirable to be able to feed articles of the same character, but which may have slight irregularities in certain dimensions, into the machine, and have a means to automatically proportion the amount of wrapping material for the articles individually according to the dimensions of each article.

It is, therefore, an object of the present invention to provide an improved wrapping material measuring and feeding device which will automatically determine the correct amount of wrapping material for an article to be wrapped and will feed said correct amount.

Another object is to provide a wrapping material measuring and feeding device which is readily adjustable for articles having varying characteristics so that a great variety of articles may be wrapped on a single machine without waste of the wrapping material.

A further object is to provide a device of the type mentioned which will accurately measure differences in the dimensions of irregular articles but will operate upon very simple principles so that it may be used efficiently and still maintain ease of operation.

Other objects and advantages will become apparent from the following detailed description accompanied by the drawings, in which like parts throughout the several views are indicated by the same reference numerals.

In the accompanying drawings,

Fig. 7 is a fragmentary sectional view taken substantially on line 7—7 of Fig. 4, illustrating the article measuring device and the wrapping material feeding means;

Fig. 8 is an enlarged fragmentary detail showing the latch mechanism for the article measuring device and taken substantialy on line 8—8 of Fig. 5;

Fig. 9 is a fragmentary plan view of the latch mechanism shown in Fig. 8 showing details thereof; and Fig. 10 is a fragmentary plan view taken substantially on line 10—10 of Fig. 7 illustrating the mechanism for adjusting the overlap of the sheet of wrapping material.

Figure 1:
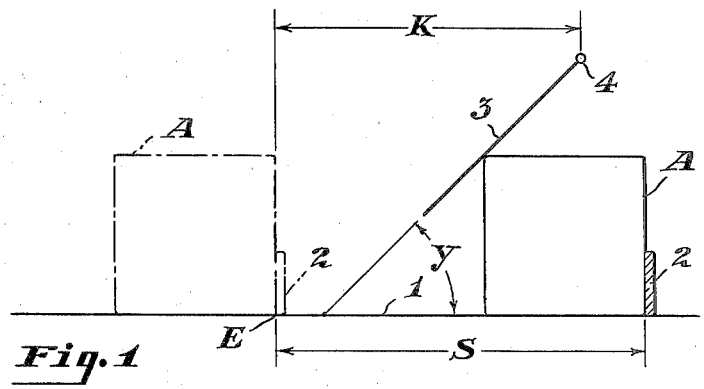
Figure 1 is a somewhat diagrammatic view of the infeed portion of a wrapping machine illustrating how one type of article may be measured and a suitable amount of wrapping material fed for the wrapping of such article.

Mechanism suitable for carrying out the present invention is shown in detail in the co-pending application of Arthur A. Kottmann, Serial No. 203,865, filed April 23, 1938. To practice the present invention, however, any suitable apparatus may be used.

The present invention will be described in connection with its application to the wrapping of articles of a commercial bakery, such as, for example, loaves of bread, cakes, pans of rolls, and the like, but, of course, the invention may be applied to the wrapping of other types of articles, too numerous to mention.

In the wrapping of articles such as loaves of bread, it is common practice to feed the articles sideways, that is, with their lengths at right angles to the direction of travel. Then, since most loaves having the same characteristics are of uniform length, the wrapping material may be fed from web rolls having a width suitable for the length of the loaves. According to this description of the present invention, therefore, the length of wrapping material, severed for any particular loaf and suitable to enclose such loaf, is measured to correspond with the height or width or the height and width of the loaf. However, it is contemplated that the present invention may be applied to wrapping machines in which the loaves are fed into the wrapping mechanism lengthwise.

Briefly, a practical way of carrying out the present invention is to provide an actuator for the wrapping material feed mechanism such that wrapping material will be fed for a predetermined period of time suitable to provide a sufficient quantity of wrapping material for a typical article having the same general characteristics as the succession of articles which it is desired to wrap. It has been found preferable to feed wrapping material, during the travel of the article advancing member, from a variable point determined by the article measuring device, said article measuring device being connected to the wrapping material feed actuator, to a set or predetermined point in the travel of the article advancing member. By arranging the article measuring device so that articles of varying height and width cause the actuator to start the wrapping material feed at the appropriate time, the amount of wrapping material will be determined by the distance between the location of the article advancing member when the article causes the actuator to start the wrapping material feed, and the fixed location of the article advancing member when the wrapping material feed is stopped.

Thus it may be seen that if the article measuring device, upon contact of the article, causes the actuator to start the wrapping material feed while the measuring device is disposed in a plane which makes an angle of approximately 45° with the surface along which the article is advanced, any changes in the height or width or in the height and width of an article from a typical article, cause the actuator to start the feed of wrapping material when the article is closer or farther away from the device a distance equal to such change in height or width. Further, if at the same time the wrapping material is fed at a speed such that its lineal speed is twice the lineal speed of the article along its supporting surface, the lengths of additional paper fed will be twice the change in height or width of the article. This insures accurate measurement of a correct amount of wrapping material for each successive article because any change in height or width, or height and width of the article causes a change in the length of the perimeter of the article equal to twice the change in height or width.

Referring now to Figure 1, a typical article A is shown on a suitable article support 1, being propelled therealong by an article advancing member or flight 2 which moves at a uniform speed at least during the time that it is advancing articles along the support 1. An article measuring device 3, in the form of a substantially flat blade, depends above the support 1, being pivotally mounted as indicated at the numeral 4. The flight 2 advances the article along the support 1 and when the article engages the measuring device 3 and the measuring device is at an angle $y$ of approximately 45° with the surface of the support 1, as shown in full lines in Fig. 1, the device 3 causes the actuator (not shown) to start the feed of wrapping material. The wrapping material is fed during the period that the flight 2 moves from its full line position to its dotted line position, indicated at E in Fig. 1, at which point the feed of wrapping material is automatically stopped. Thus wrapping material is fed during the time the flight moves from its full line position to its dotted line position, that is, wrapping material will be continuously fed while the flight 2 moves the distance indicated by the letter S.

The point E has previously been established at a distance K from the pivot point 4 of the measuring device 3 so that the distance S is proportional to the correct amount of wrapping material for the typical article A. The distance S will be equal to one-half of the perimeter of the article A, plus a length sufficient to provide a suitable overlap.

Of course an overlap adjustment may be provided on the machine if desired as shown and described in detail in the above mentioned copending application.

Figure 2:
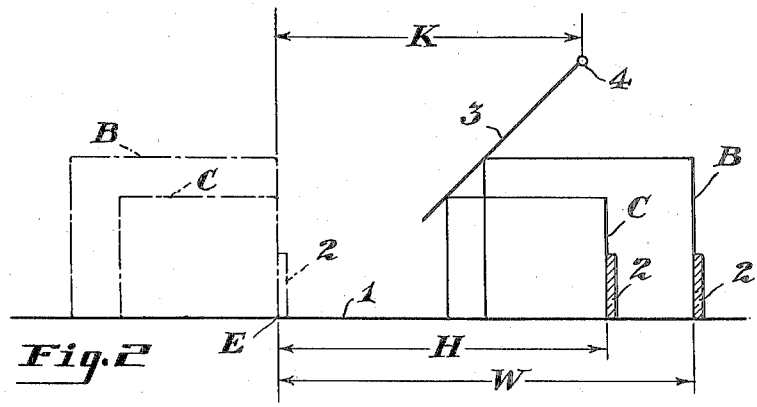
Fig. 2 is a view similar to Fig. 1 but showing how a measuring device embodying the present invention is responsive to changes in the height and width of articles.

Then with the distance K maintained constant, articles having the same general characteristics as the article A but which may vary in height or width or height and width, may be passed through the machine and an accurately measured length of wrapping material will be provided for each of said articles. For example, in Fig. 2, an article B having the same height but of a greater width than article A, is shown. Wrapping material, therefore, will be continuously fed while the flight 2 passes from its full line position to its dotted line position at E (Fig. 2) and a length of wrapping material proportional to the distance W will be withdrawn. The difference in width between articles A and B is the distance W minus S (W—S), and the difference in length of wrapping material of articles A and B will be two times the quantity W minus S [2(W—S)].

Similarly, the article C, being of the same width as the typical article A but of less height, will have wrapping material fed therefor proportional to the distance H. The difference in height between articles A and C is S minus H (S—H), and the difference in length of wrapping material withdrawn will be two times the quantity S minus H [2(S—H)].

Figure 3:
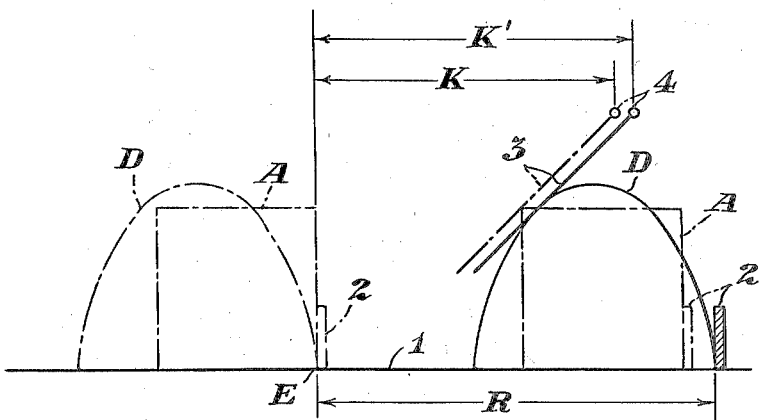
Fig. 3 is a view similar to Fig. 1, illustrating how the device may be readily adjusted for articles having different characteristics.

When it is desired to wrap a succession of articles having general characteristics differing from the article A, such as, for example, the article D in Fig. 3, which has rounded surfaces at the top portions thereof, it is only necessary to change the distance K to a distance K′ suitable for a typical article of such series, and then all other articles of that series may be passed through the wrapping material, and each article will be accurately measured for changes in height or width or height and width. In Fig. 3 this has been accomplished by moving the point 4 from its dotted line position to its full line position, where the distance K′ measures a correct amount of wrapping material for a typical article of the series having the characteristics of article D. Wrapping material for the article D will be fed during the time that the flight 2 moves from its full line position in Fig. 3 to its dotted line position at E, feeding a length of wrapping material proportional to the distance R.

It has been found in practice that relatively small deviations, such as 2 or 3 degrees or so from the 45° angle $y$ formed by the measuring device 3 and the surface of the support 1, do not materially affect the operation of the device, and this is also true of the 2:1 ratio of the lineal speed of wrapping material and the lineal speed at which articles move along the support 1.

A suitable mechanism for carrying out the principles of the present invention is illustrated in Figs. 4 to 9, inclusive, which show the mechanism employed in the previously mentioned copending application of Arthur A. Kottmann. In this mechanism the infeed conveyor to the wrapping machine (Figs. 4 and 7) includes a pair of spaced parallel supporting members 100 and 101 which may be suitably formed of channels disposed in opposed relation so that the channels of the members open toward one another. The supporting members are carried by frame F of the wrapping machine by suitable means (not shown) and are provided at the wrapping machine end of the conveyor with fittings which serve as journals for a transverse driven shaft 105 (Fig. 7) which carries conveyor chain sprockets 106 which are substantially in alignment with the members 100 and 101. Conveyor side chains 108 are carried in spaced parallel relation by the sprockets 106 and by a similar pair of sprockets (not shown) mounted on a transverse shaft at the opposite end of the conveyor.

Extending between and carried by the uppermost flanges of the supporting members 100 and 101 is an article supporting apron 1. The end of the apron 1 at the wrapping machine end of the conveyor is referred to as the infeed station of the wrapping machine since it is here that articles first engage wrapping material and are removed from the conveyor for the wrapping operations. The portion of the apron 1 which forms the infeed station is above the shaft 105 and the corner marginal portions are removed (Fig. 4) to provide recesses which accommodate the conveyor belt sprockets 106.

The endless conveyor belts or chains 108 carry between them at uniformly spaced intervals, transverse flights 117 having upstanding auxiliary pusher plates 2. The sprockets 106 secured on shaft 105 are rotated in synchronous timed relation and maintain the flights in proper transverse position across the conveyor apron. The shaft 105 extends beyond one of the sprockets so that driving power may be applied thereto to rotate the shaft and the sprockets in synchronization with other portions of the wrapping machine.

Wrapping material may be supplied in one or more continuous sheets or webs from suitable rolls (not shown). The free end of the wrapping material passes between a pair of feed rollers 217 and 218. Bottom feed roller 218 comprises a tubular member of suitable material carried on a shaft 246 journaled in the side frames. The top or small feed roller 217 is carried in a suitable manner above the feed roller 218 and is driven by it. The roller 217 carries at spaced intervals circumferential bands 250 formed of a soft elastic material such as rubber. These bands space the feed roller 217 from the feed roller 218 and frictionally engage the wrapping material P between the rollers.

Figure 6:
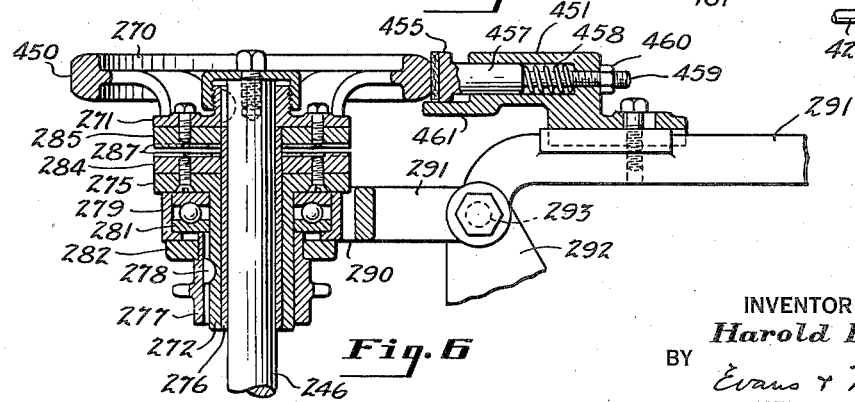
Fig. 6 is an enlarged fragmentary detail view of a clutch and brake mechanism for the wrapping material feed rollers shown in Fig. 4.

One end of the shaft 246 of the bottom feed roller extends beyond its journal in the side frame F and carries a hand wheel 270. This wheel has a hub 271 mounted on the shaft 246 and secured against rotation by a key (Fig. 6). The hand wheel 270 is spaced from the side frame to provide room on the shaft 246 for a clutch sleeve 272 having a rigidly disposed flange 275 on the end thereof adjacent the hand wheel hub. This sleeve is freely rotatable on the shaft 246 and rides on an anti-friction bushing 276. A sprocket 277 is carried by the clutch sleeve and is longitudinally slidable thereon, being secured against relative rotation by a key 278. A ball thrust bearing assembly 281 is mounted on the clutch sleeve 272 between the radial flange 275 and an annular collar 282 carried by the elongated hub portion of the sprocket 277. The bearing assembly is enclosed in a collar 279, having an inwardly directed flange engaged by the collar 282. The sprocket 277 is connected by a chain belt 283 (Fig. 4) to a driving sprocket (not shown) which is secured on a continuously rotating driving shaft. The flange 275 of the clutch sleeve is provided with a toothed clutch disk element 284 and a mating toothed clutch disk element 285 is carried by the hub 271 of the hand wheel. These clutch elements have opposing faces provided with fine radially extending teeth 287. The direction of rotation of the sprocket 277 and the configuration or slope of the faces of the teeth 287 are such that when the clutch elements are brought into engagement, a driving connection is established between the driving shaft and the wrapping material feed rollers 217 and 218, so that the latter are rotated to feed wrapping material from left to right as viewed in Figs. 4 and 7.

Annular bosses, diametrically opposed to one another, are formed on the annular collar 279 for connection to the ends of a yoke 290 carried on one end of a clutch actuating lever 291. This lever is pivotally mounted on a stud 293 carried by a bracket 292 secured to the side frame of the machine adjacent the shaft 246. The oscillation in a horizontal plane of the clutch actuating lever 291 is controlled in a manner to be hereinafter described and brings the clutch element 284, driven at a constant rotational velocity by the sprocket 277, into and out of engagement with the clutch element 285 having a driving connection with the shaft 246, thus starting and stopping the wrapping material feed rolls 217 and 218.

When the clutch elements 284 and 285 are disengaged the feed rolls 217 and 218 may be freely rotated in either direction by the hand wheel 270, so that the web P may be readily threaded.

As an article is advanced over the apron 1 toward the infeed station of the wrapping machine, it engages the article measuring device 3 which is carried by a pivot bar 407, which is in turn journaled in and supported by brackets 413 and 414 secured respectively to the supporting members 100 and 101. Preferably, each of these brackets has a ball bearing journal, indicated at 415 (Fig. 9), to receive an end of the pivot bar 407 in order that the latter may rotate with a minimum of friction. The pivot bar is supported with its axis at substantially right angles with respect to the direction of movement of articles over the infeed conveyor and a sufficient distance above the apron 1 so that the largest articles intended to be packaged will have adequate clearance thereunder.

The latch mechanism, illustrated in detail in Figs. 8 and 9, is carried by the pivot bar 407. This latch comprises a quadrant 416 positioned transversely of the axis of the pivot bar and rotatably carried on the latter by hub 417. The hub 417 is positioned on the end of the pivot bar 407 adjacent the ball bearing journal 415 of the bracket 417 and is held against longitudinal sliding movement on the pivot bar by a clamping hub member 418 which is secured to the pivot bar 407 by means of a tightening bolt 419. Extending radially from the hub 418 is an arm 420 having an aperture in its extremity to slidably receive the threaded end of an adjusting bolt 421. The opposite end of the bolt 421 is threadably secured in an extension 422 on the quadrant member 416. A pair of lock nuts 423 carried on the threaded end of the adjusting bolt 421 enables the quadrant 416 to be rotated slight amounts about the axis of the pivot bar 407 and a compression spring 424 positioned between the arm 420 and the extension 422 urges the arm against the thumb nut so that the quadrant 416 is retained in adjusted position with respect to the pivot bar 407. This construction permits the article measuring device 3 to be adjusted angularly with respect to the article supporting apron 1.

To maintain the article engaging member 3 in its normal position as shown in dotted lines in Fig. 7, the arm 420 carries a dog 448 (Fig. 9) which is arranged to engage an inwardly extending lug 449 on the bracket 413. Thus, after the article measuring device 3 has been released by an article it may swing downwardly until the dog 448 engages the lug 449 and holds it in its normal position.

Figure 4:
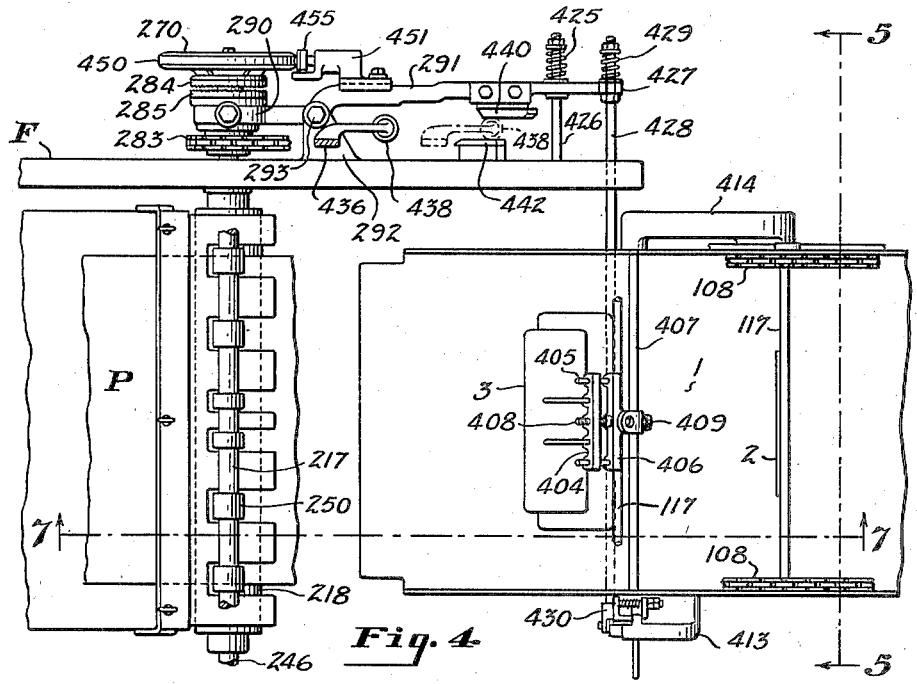
Fig. 4 is a plan view with parts removed showing a mechanism which may be used to carry out the principles embodied in the present invention.

Referring to Fig. 4, the long arm of the clutch actuating lever 291 is urged toward side frame F by a compression spring 425 carried on a rod 426 extending through an aperture in the lever 291 and screwed into the side frame. The free end of the clutch actuating lever 291 extends upwardly and is bifurcated at 427 (Fig. 7) to receive a tie rod 428. The end of the tie rod 428 is threaded to receive a pair of nuts which are disposed on opposite sides of the lever 291 (Fig. 4). A compression spring 429 is carried by the tie rod 428 between the outer nut and the lever 291. The tie rod 428 extends through apertures in the side frame F and supporting members 100 and 101, and terminates in a clevis 430 (Fig. 5) adjacent the bottom portion of the bracket 413 secured to the supporting member 100.

Pivoted at 431 to the bracket 413 is a latch lever 432 having an angularly disposed arcuate shaped foot 433 with its center of curvature at the pivot. Heel 434 of the lever normally engages a marginal portion of the quadrant 416 and retains the latch 432 in an upright position as indicated by the full lines of Fig. 5. The end of the latch opposite the foot 433 is pivoted in the clevis 430, and the end of the clutch actuating lever 291 engaged by the end of the tie rod 428 is held outwardly away from the side frame 6 against the compression of the spring 425. In this position the clutch elements 284 and 285 are disengaged so that there is no driving engagement between the sprocket 277 and the wrapping material feed rolls 217 and 218. The position of the quadrant 416 on the pivot bar 407 is arranged so that when the wrapping material advancing clutch is thus held in disengaged position the member 3 is suspended in article engaging position over the infeed conveyor apron 1.

Upon being engaged by an article moving over the conveyor apron the member 3 is rotated from its normal position shown in dotted outline in Fig. 7 in a clockwise direction toward its full line position shown in Fig. 7. This movement of the member 3 rotates the pivot bar 407 in a counterclockwise direction as viewed in Fig. 8. Upon sufficient movement in this manner radial or latch releasing edge 435 of the quadrant 416 moves beyond the heel 434 of the latch lever 432 so that the latter is released and moves to the broken line position indicated in Fig. 5. At the moment of release the member 3 is at an angle of substantially 45° with the article supporting apron, as shown in full lines in Fig. 7. This movement of the latch lever is energized by the compression spring 425 through the clutch actuating lever 291 and tie rod 428. Movement of an article past the member 3 releases the latter to fall or rotate downwardly by gravity. The foot 433 of the latch lever 432 engages the edge 435 of the quadrant to prevent the quadrant from moving past the latch lever in the event that the latch lever has not been returned to its vertical position, as will be hereinafter described. Release of the latch lever by the quadrant 416 permits the clutch actuating lever 291 to pivot at 293 under the influence of spring 425 and slide the clutch sleeve 272 along the shaft 246, thus engaging the clutch elements 284 and 285 to energize the feed rolls through the sprocket 277 and chain belt 283.

The feed rolls 217 and 218 advance wrapping material until the long arm of the clutch actuating lever 291 is moved outwardly away from the side frame F to disengage the clutch elements 284 and 285. This disengagement of the clutch is accomplished by a lever arm 436 (Fig. 4) which moves in an arcuate path and carries on its extremity roller 438. As the lever 436 moves to its dotted line position shown in Fig. 4, the roller 438 engages a cam member 440 adjustably secured to the clutch actuating lever 291 adjacent the compression spring rod 419 and arranged so that the cam member 440 faces toward the side frame 6. On the frame opposite the cam member 440 is formed a cam roller guide or pad 442 which is engaged by the roller 438. The cam member 440 and the cam roller guide 442 are arranged so that upon movement of the clutch release arm 436 into the dotted line position illustrated in Fig. 4, the clutch actuating arm 291 is kicked outwardly away from the side frame F sufficiently to disengage the clutch elements 284 and 285 and move the tie rod 428 to the right as viewed in Fig. 5, so that the latch lever 432 is raised from the broken line position to the solid line position. This pivotal movement of the latch lever carries the foot 433 and heel 434 thereof beyond the latch releasing edge 435 of the quadrant 416, thus permitting the pivot bar 407 to rotate to its normal position as the member 3, previously released by the article, falls by gravity to its normal position. Upon movement of the clutch release arm 436 from between the cam member 440 and cam roller guide 442, the clutch actuating arm 291 is retained in its outer position by the tie rod 428 which is held to the right as viewed in Fig. 5 against the compression of spring 425 by the latch lever 432 which is held in its vertical solid line position by the quadrant 416 against positioned in front of the heel 434 of the latch lever.

The reciprocable movement of the clutch arm 436 from its dotted line position to its full line position in Fig. 4 is timed with respect to the remainder of the wrapping machine mechanism so that it disengages the feed roller clutch at a definite point in the wrapping cycle, and when a flight advancing an article on the infeed conveyor past the member 3 is in a definite position with respect to the infeed station and said member. The position of the flight at the moment of release is designated by E in Figs. 1–3.

Since the movement of the clutch actuating lever 291 caused by the engagement between the cam member 440 and the release arm 436 only serves to disengage the clutch elements 284 and 285, the feed rolls are likely to continue to advance a short and variable amount of wrapping material on account of overrunning caused by their inertia. It is desirable that this overrunning be minimized so that the feed of wrapping material is positively arrested at the instant the clutch release arm 436 engages the cam member 440. In the present machine this is accomplished by a brake which engages a flattened peripheral portion 450 on the hand wheel 270

(Fig. 4). This brake comprises an adjustable supporting bracket 451 (Fig. 6) carried by the clutch release lever 291 adjacent the pivot 293. A brake shoe 455 provided with a suitable lining of asbestos or other suitable friction material is carried by a cylindrical plunger 457 received within a cylindrical aperture formed in the bracket 451 and having an axis in the rotational plane of the hand wheel 270. The cylindrical aperture in the bracket 451 is of sufficient depth to accommodate a compression spring 458 carried by a rod 459 formed as an extension of the plunger 457 and coaxial therewith. This rod extends through an aperture in the bracket and has an external end threaded to receive a holding nut 460. The plunger 457 and rod 459 are thus movably secured by the bracket 451 and resiliently urged toward the flat friction face 456 of the hand wheel 270 by the spring 458. An extension 461 of the bracket has a flat face which engages a side of the shoe 455 to prevent rotational movement of the plunger and shoe with respect to the bracket. By adjustment of the nut 460 on the threaded end of the rod 459 the brake shoe 455 can be moved toward and away from the friction surface 456 of the hand wheel. This adjustment is regulated so that just prior to engagement of the teeth of the clutch elements 284 and 285 effected by the pivotal movement of the clutch actuating lever 291, the brake releases the hand wheel 270. Reverse pivotal movement of the lever 291 brings the brake into engagement with the hand wheel immediately after disengagement of the clutch elements 284 and 285. Thus there is a substantially positive control of the feed rollers so that the wrapping material is accurately advanced during an interval which is determined in accordance with the size of the article for which the particular sheet being advanced is intended.

The adjustment to regulate the amount of overlap (shown in Fig. 3 as a variation of the distance K to K' and there obtained by moving the pivot point 4) may be accomplished with substantially the same results by bodily moving the article measuring device 3 in approximately a horizontal direction away from the pivot point 4. To obtain this movement the article measuring device 3 is mounted on a pair of parallel rods 401 which are in turn secured to an adjustable bracket 404. The bracket 404 is slidably mounted on spaced parallel supporting rods 405 which are secured to a bracket member 406 clamped to the pivot bar 407. A threaded rod 408 having a knurled knob 409 is rotatably mounted in spaced journal bosses 410 carried by the bracket member 406 and has threaded engagement in the adjustable bracket 404. By turning the knurled knob 409 the threads on the rod 408 cause the adjustable bracket 404 to move along the parallel rods 405 toward and away from the pivot bar 407. Movement of the adjustable bracket 404 to the left as viewed in Figs. 4, 7, or 10 advances the article engaging plate 3 in the direction of article movement, delaying the start of wrapping material feed and reducing the length of the sheet of wrapping material fed, thus decreasing the overlap. Also movement of the adjustable bracket 404 to the right, as viewed in Figs. 4, 7, or 10, carries the device 3 so that it will be engaged earlier by the articles advancing to the wrapping mechanism and a proportionately longer sheet of wrapping material will be fed or the overlap is increased.

Figure 5:
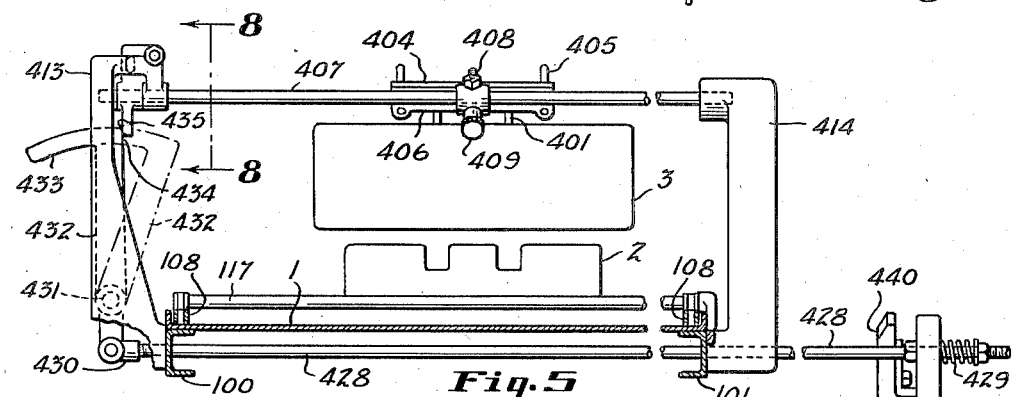
Fig. 5 is an enlarged transverse elevational view across the infeed conveyor of a wrapper machine showing the latch mechanism for the article measuring device and taken substantially on line 5—5 of Fig. 4.

An article being advanced over the infeed conveyor apron 1 by one of the flights 117 engages the member 3 of the article measuring mechanism and causes the latch lever 432 to be released by the quadrant 416, Fig. 5, permitting the compression spring 425 to pivot the clutch actuating arm 291 (Fig. 4), thus causing engagement between the clutch elements 284 and 285 and establishing a driving connection to rotate the feed rolls 217 and 218. These feed rolls instantaneously commence the feeding of wrapping material and continue the feeding until the flight 117, which advances the article causing the actuation of the wrapping material fed, reaches the predetermined point E previously discussed. At this point the movement of the clutch actuating lever 291, caused by the clutch release arm 436, disengages the clutch elements 284 and 285 and stops the feed rolls 217 and 218, the brake 455 engaging the hand wheel 270.

Thus it may be seen that the present invention provides an article measuring and feeding device for wrapping machines which measures accurately a correct amount of wrapping material corresponding to the height or width or height and width of articles being wrapped. Furthermore, when articles having the same general characteristics are being wrapped it is not necessary to grade the same as the mechanism embodying the present invention will automatically take care of any individual articles which vary considerably in their dimensions.

It is contemplated that the principles of this invention may be applied to a measuring and feeding device which works in reverse order from that described. That is, the wrapping material may start to feed automatically at a predetermined point and the measuring device be constructed to stop the wrapping material feed according to the size of the loaf. Operation of such a modification will in other respects be substantially identical.

Furthermore, it is to be understood that the other variations and modifications of the specific devices herein shown and described for purposes of illustration and explanation, may be made without departing from the spirit of the present invention.

What I claim is:

1. In a wrapping machine having means for advancing articles into the wrapping mechanism, wrapping material feed means adapted to feed lengths of wrapping material at a lineal speed twice the lineal speed at which articles are advanced by the advancing means, a measuring device responsive to changes in both the height and width of articles which comprises an actuator for said wrapping material feed means having a member disposed in a plane and adapted to contact the article to be measured, said member actuating said wrapping material feed means when disposed at an angle of approximately 45° with the plane along which the article is traveling and in contact with the article.

2. In a wrapping machine the combination of means for feeding wrapping material at a lineal speed approximately twice the lineal speed at which articles are advanced, and an actuator for said feeding means to start the feed means when the article to be measured contacts the actuator at a point where the plane of the actuator is disposed at an angle of approximately 45° with the plane over which the article moves.

3. In a wrapping machine having means for advancing articles into the wrapping mechanism, a continuous supply of wrapping material from which individual sheets may be severed, means for feeding wrapping material drawn from said supply, a control means adapted to actuate said feeding means for a length of time sufficient to feed enough wrapping material for a typical article, and means for feeding a length of wrapping material longer by twice the total increase in height and width of an individual article than the length of wrapping material for the typical article.

4. In a wrapping machine having means for advancing a succession of articles into the wrapping mechanism, wrapping material feed means adapted to feed lengths of wrapping material, a control means adapted to actuate said feed means for a time to feed sufficient wrapping material to suitably enclose a typical article of the succession, and means operable by individual articles of the succession to feed a length of wrapping material less by twice the total decrease in height and width of the individual article than the length of wrapping material for the typical article.

5. In a wrapping machine having means for advancing a succession of articles into the wrapping mechanism, wrapping material feed means adapted to feed lengths of wrapping material, a control means adapted to actuate said feeding means for a length of time to feed sufficient wrapping material to suitably enclose a typical article of the succession, means operable by individual articles of the succession to feed a length of wrapping material longer than the length of wrapping material for the typical article by twice the total increase in the height and width of the individual article over the height and width of the typical article, and means operable by individual articles of the succession to feed a length of wrapping material less by twice the total decrease in height and width of the individual article than the length of wrapping material for the typical article.

6. In a wrapping machine having means for advancing articles to the wrapping mechanism, wrapping material feed means which feeds wrapping material at a lineal speed equal to twice the lineal speed of articles being advanced toward the wrapping mechanism and is arranged to stop the wrapping material feed when the article advancing means reaches a predetermined point in its path, and an actuator for starting the feed of said wrapping material having an article contacting member which is disposed at an angle of 45° with the plane along which the articles are being advanced at the instant when the wrapping material feed is actuated.

7. In a wrapping machine having means for advancing articles to the wrapping mechanism, wrapping material feed means which feeds wrapping material at a lineal speed equal to twice the lineal speed of articles being advanced toward the wrapping mechanism and is arranged to stop the wrapping material feed when the article advancing means reaches a predetermined point in its path, an actuator for starting the feed of said wrapping material having an article contacting member which is disposed at an angle of 45° with the plane along which the articles are being advanced at the instant when the wrapping material feed is actuated, and means for adjusting the position of said actuator with respect to said predetermined point.

HAROLD H. MOHL.